United States Patent
Lee et al.

(10) Patent No.: US 10,396,964 B2
(45) Date of Patent: *Aug. 27, 2019

(54) METHOD AND APPARATUS FOR TRANSMITTING AND RECEIVING FEEDBACK INFORMATION IN MOBILE COMMUNICATION SYSTEM USING MULTIPLE ANTENNAS

(71) Applicant: Samsung Electronics Co., Ltd., Gyeonggi-do (KR)

(72) Inventors: Hyojin Lee, Gyeonggi-do (KR); Younsun Kim, Gyeonggi-do (KR); Yongjun Kwak, Gyeonggi-do (KR); Youngbum Kim, Seoul (KR); Juho Lee, Gyeonggi-do (KR); Hyoungju Ji, Seoul (KR)

(73) Assignee: Samsung Electronics Co., Ltd (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/812,434

(22) Filed: Nov. 14, 2017

(65) Prior Publication Data

US 2018/0069680 A1    Mar. 8, 2018

Related U.S. Application Data

(63) Continuation of application No. 14/193,741, filed on Feb. 28, 2014, now Pat. No. 9,871,639.

(30) Foreign Application Priority Data

Feb. 28, 2013 (KR) .................. 10-2013-0021903

(51) Int. Cl.
*H04L 5/00* (2006.01)
*H04B 7/0456* (2017.01)
*H04B 7/06* (2006.01)

(52) U.S. Cl.
CPC ......... *H04L 5/0057* (2013.01); *H04B 7/0478* (2013.01); *H04B 7/065* (2013.01);
(Continued)

(58) Field of Classification Search
CPC .. H04B 7/0632; H04B 17/309; H04B 7/0417; H04B 7/0691; H04B 7/0639;
(Continued)

(56) References Cited

U.S. PATENT DOCUMENTS 9,871,639 B2 * 1/2018 Lee ....................... H04L 5/0048
2010/0202372 A1   8/2010 Chun
(Continued)

FOREIGN PATENT DOCUMENTS

CN    102315871        1/2012
KR    1020100088554    8/2010
(Continued)

OTHER PUBLICATIONS

Alcatel-Lucent Shanghai Bell, "Considerations on CSI Feedback Enhancements for High-Priority Antenna Configurations", R1-112420, 3GPP TSG-RAN WG1 #66, Aug. 22-26, 2011, 7pgs.
(Continued)

*Primary Examiner* — Benjamin H Elliott, IV
(74) *Attorney, Agent, or Firm* — The Farrell Law Firm, P.C.

(57) ABSTRACT

A method and an apparatus for transmitting/receiving feedback in a mobile communication system are provided. A method of configuring and receiving feedback information of an evolved Node B (eNB) includes transmitting configuration information on a plurality of reference signals including a first reference signal and a second reference signal to a User Equipment (UE); transmitting feedback configuration information including first feedback configuration information on the first reference signal and second feedback
(Continued)

configuration information configured such that feedback information on the second reference signal is generated with reference to the first feedback configuration information to the UE; transmitting the reference signal to the UE according to the configuration information on the reference signal; and receiving feedback information including first feedback information according to the first feedback configuration information and second feedback information according to the second feedback configuration information from the UE.

12 Claims, 14 Drawing Sheets

(52) U.S. Cl.
CPC ............ *H04L 5/0048* (2013.01); *H04B 7/063* (2013.01); *H04B 7/0632* (2013.01); *H04B 7/0639* (2013.01)

(58) Field of Classification Search
CPC ... H04B 7/0456; H04L 1/0687; H04L 1/0693; H04L 5/0057; H04L 25/03898; H04J 13/0022
See application file for complete search history.

(56) References Cited

U.S. PATENT DOCUMENTS

| | | |
|---|---|---|
| 2011/0150052 A1 | 6/2011 | Erell |
| 2011/0205930 A1 | 8/2011 | Rahman |
| 2011/0274071 A1 | 11/2011 | Lee et al. |
| 2012/0039298 A1 | 2/2012 | Lee et al. |
| 2012/0176939 A1 | 7/2012 | Qu |
| 2012/0287875 A1 | 11/2012 | Kim et al. |
| 2012/0320819 A1 | 12/2012 | Kim et al. |
| 2013/0083681 A1 | 4/2013 | Ebrahimi Tazeh Mahalleh |
| 2013/0195035 A1 | 8/2013 | Taoka et al. |
| 2013/0242778 A1 | 9/2013 | Gelrhofer |
| 2013/0329664 A1 | 12/2013 | Kim et al. |
| 2014/0192762 A1 | 7/2014 | Li et al. |
| 2014/0204770 A1 | 7/2014 | Mondal |
| 2014/0241274 A1 | 8/2014 | Lee |
| 2018/0069680 A1* | 3/2018 | Lee ........................ H04L 5/0048 |

FOREIGN PATENT DOCUMENTS

| | | |
|---|---|---|
| KR | 1020100116550 | 11/2010 |
| WO | WO 2011/136331 | 11/2011 |
| WO | WO 2012/169817 | 12/2012 |
| WO | WO 2013/024350 | 2/2013 |

OTHER PUBLICATIONS

Japanese Office Action dated Feb. 5, 2018 issued in counterpart application No. 2015-560089, 16 pages.
Chinese Office Action dated Nov. 9, 2017 issued in counterpart application No. 201480017252.3, 9 pages.
European Search Report dated Nov. 20, 2014 issued in counterpart application No. 14156013.6-1852, 16 pages.
Nokia Siemens Networks et al., "Study on Downlink Enhancements for Elevation Beamforming for LTE", RP-121413, Sep. 5, 2012, 5 pages.
Ad-hoc Chairman (Samsung), "Summary of Ad-hoc Session on 3D-Channel Model for Elevation Beamforming and FD-MIMO", R1-130793, 3GPP TSG Ran WG1 Meeting #72, Jan. 28-Feb. 1, 2013, 2 pages.
Korean Office Action dated Feb. 14, 2019 issued in counterpart application No. 10-2013-0021903, 8 pages.

* cited by examiner

METHOD AND APPARATUS FOR TRANSMITTING AND RECEIVING FEEDBACK INFORMATION IN MOBILE COMMUNICATION SYSTEM USING MULTIPLE ANTENNAS

PRIORITY

This application is a continuation application of U.S. patent application Ser. No. 14/193,741, which was filed on Feb. 28, 2014 and which claims priority under 35 U.S.C. § 119(a) to Korean Patent Application No. 10-2013-0021903, which was filed in the Korean Intellectual Property Office on Feb. 28, 2013, the entire contents of which are incorporated herein by reference.

BACKGROUND

1. Field of the Invention

The present invention generally relates to a wireless mobile communication system, and more particularly, to a method of transmitting/receiving channel status information in which a User Equipment (UE) measures channel quality (wireless channel status) and informs an evolved Node B (eNB) of a measurement result in a wireless mobile communication system applying a multi-access scheme using a multi-carrier, such as an Orthogonal Frequency Division Multiple Access (OFDMA) scheme.

2. Description of the Related Art

A current mobile communication system has been developed to a high speed and high quality wireless packet data communication system to provide a data service and a multimedia service in addition to providing an initial service mainly based on a voice service. An evolved 3rd Generation mobile communication system standard employing a multiple access scheme using a multi-carrier is progressed by various standardization organizations, such as 3rd Generation Partnership Project (3GPP), 3GPP2, Institute of Electrical and Electronics Engineers (IEEE), and the like. Recently, various mobile communication standards including Long Term Evolution (LTE) of 3GPP, Ultra Mobile Broadband (UMB) of 3GPP2, 802.16m of IEEE and the like have been developed to support a high speed and high quality wireless packet data transmission service based on the multiple access scheme using the multi-carrier.

The evolved 3rd Generation mobile communication systems, such as LTE, UMB, 802.16m, and the like, are based on a multi-carrier multiple access scheme, apply beamforming to improve a transmission efficiency, and use various technologies including an Adaptive Modulation and Coding (AMC) method, a channel sensitive scheduling method, and the like. The various technologies improve system capacity performance by improving the transmission efficiency through a method of concentrating transmission power transmitted from a plurality of antennas or controlling an amount of transmitted data according to channel quality and selectively transmitting data to a user having better channel quality. Since most of such schemes are performed based on channel status information between an evolved Node B (eNB) (or Base Station (BS)) and a User Equipment (UE) (or a Mobile Station (MS)), the eNB or the UE is required to measure a channel status between the eNB and the UE. A Channel Status Indication Reference Signal (CSI-RS) is used for measuring the channel status. The aforementioned eNB refers to a downlink transmission device and an uplink reception device located at a predetermined location, and one eNB performs transmission/reception for a plurality of cells. In one mobile communication system, a plurality of eNBs are geographically distributed and each of the eNBs performs transmission/reception of a plurality of cells.

Existing 3rd and 4th Generation mobile communication systems such as LTE/LTE-A use a Multi Input Multi Output (MIMO) technique of performing transmission by using a plurality of transmission/reception antennas in order to expand a data transmission rate and system capacity. The MIMO technique transmits a plurality of information streams spatially divided, by using a plurality of transmission/reception antennas. As described above, transmission of the plurality of information streams spatially divided is referred to as spatial multiplexing. In general, a number of information streams to which the spatial multiplexing can be applied varies depending on a number of antennas of a transmitter and a receiver. Information on the number of information streams to which the spatial multiplexing can be applied is generally referred to as a rank of corresponding transmission. The MIMO technique supported by the LTE/LTE-A Release 11 standard supports spatial multiplexing in a case where each of transmission and reception antennas is 8 and maximally supports rank 8.

However, when a plurality of transmission/reception antennas exist, large resources are consumed in measuring and reporting channel statuses between antennas of the transmitter and the receiver, so that a solution to the above problem is required.

SUMMARY

The present invention has been made to solve the above problems and disadvantages and to provide at least the advantages described below.

Accordingly, an aspect of the present invention is to provide a method and an apparatus in which the UE measures an RS, generates channel status information, and transmits the channel status information to effectively transmit/receive data in Full Dimension MIMO (FD-MIMO) transmission/reception based on the LTE-A system.

Another aspect of the present invention is to provide a method and an apparatus in which the eNB transmits an RS to the UE and receives channel status information transmitted by the UE.

In accordance with an aspect of the present invention, a method of configuring and receiving feedback information of an evolved Node B (eNB) in a mobile communication system is provided. The method includes transmitting configuration information on a plurality of reference signals including a first reference signal and a second reference signal to a User Equipment (UE); transmitting feedback configuration information including first feedback configuration information on the first reference signal and second feedback configuration information configured such that feedback information on the second reference signal is generated with reference to the first feedback configuration information to the UE; transmitting the reference signals to the UE according to the configuration information on the reference signals; and receiving feedback information including first feedback information according to the first feedback configuration information and second feedback information according to the second feedback configuration information from the UE.

In accordance with another aspect of the present invention, a method of transmitting feedback information of a User Equipment (UE) in a mobile communication system is provided. The method includes receiving configuration information on a plurality of reference signals including a first reference signal and a second reference signal from an evolved Node B (eNB); receiving feedback configuration information including first feedback configuration information on the first reference signal and second feedback configuration information configured such that feedback information on the second reference signal is generated with reference to the first feedback configuration information from the eNB; receiving the reference signals from the eNB according to the configuration information on the reference signals; and transmitting feedback information including first feedback information according to the first feedback configuration information and second feedback information according to the second feedback configuration information to the eNB.

In accordance with another aspect of the present invention, an evolved Node B (eNB) receiving feedback information in a mobile communication system is provided. The eNB includes a transceiver for transmitting/receiving a signal to/from a User Equipment (UE); and a controller for controlling to transmit configuration information on a plurality of reference signals including a first reference signal and a second reference signal to a User Equipment (UE), transmit feedback configuration information including first feedback configuration information on the first reference signal and second feedback configuration information configured such that feedback information on the second reference signal is generated with reference to the first feedback configuration information to the UE, transmit the reference signals to the UE according to the configuration information on the reference signals, and receives feedback information including first feedback information according to the first feedback configuration information and second feedback information according to the second feedback configuration information from the UE, and process the received feedback information.

In accordance with another aspect of the present invention, a User Equipment (UE) transmitting feedback information in a mobile communication system is provided. The UE includes a transceiver for transmitting/receiving a signal to/from an evolved Node B (eNB); and a controller for controlling to receive configuration information on a plurality of reference signals including a first reference signal and a second reference signal from eNB, receive feedback configuration information including first feedback configuration information on the first reference signal and second feedback configuration information configured such that feedback information on the second reference signal is generated with reference to the first feedback configuration information from the eNB, receive the reference signals from the eNB according to the configuration information on the reference signals, and transmit feedback information including first feedback information according to the first feedback configuration information and second feedback information according to the second feedback configuration information to the eNB.

BRIEF DESCRIPTION OF THE DRAWINGS

The foregoing and other aspects, features and advantages of certain embodiments of the present invention will become more apparent from the following detailed description when taken in conjunction with the accompanying drawings in which.

DETAILED DESCRIPTION OF EMBODIMENTS OF THE PRESENT INVENTION

Hereinafter, embodiments of the present invention will be described in detail with reference to the accompanying drawings. In the following description of the present invention, a detailed description of known functions or configurations incorporated herein will be omitted when it may make the subject matter of the present invention unclear. Meanwhile, terms described herein are defined in consideration of the functions of the present specification, but the meaning of the terms may be changed according to a user, intention of an operator, or convention. Therefore, the definition needs to be determined based on the overall contents of the present specification.

Further, the detailed description of embodiments of the present invention is made mainly based on a wireless communication system based on OFDM, particularly a 3GPP EUTRA standard, but the subject matter of the present invention can be applied to other communication systems having a similar technical background and channel form after a little modification without departing from the scope of the present invention, and the above can be determined by those skill in the art.

Hereinafter, although a Channel Status Information Reference Signal (CSI RS) which an eNode B (eNB) transmits to a User Equipment (UE) will be described as an example, the present invention is not limited thereto and may include all types of signals, RSs and the like which can measure a channel status.

The technique provided by the present invention is applied to a Full Dimension Multiple Input Multiple Output (FD-MIMO) system. The FD-MIMO system corresponds to a system using 32 or more transmission antennas evolved from a conventional Long Term Evolution/Long Term Evolution-Advanced (LTE/LTE-A) MIMO technique using 8 antennas.

The FD-MIMO system refers to a wireless communication system in which data is transmitted using scores of transmission antennas.

Figure 1:
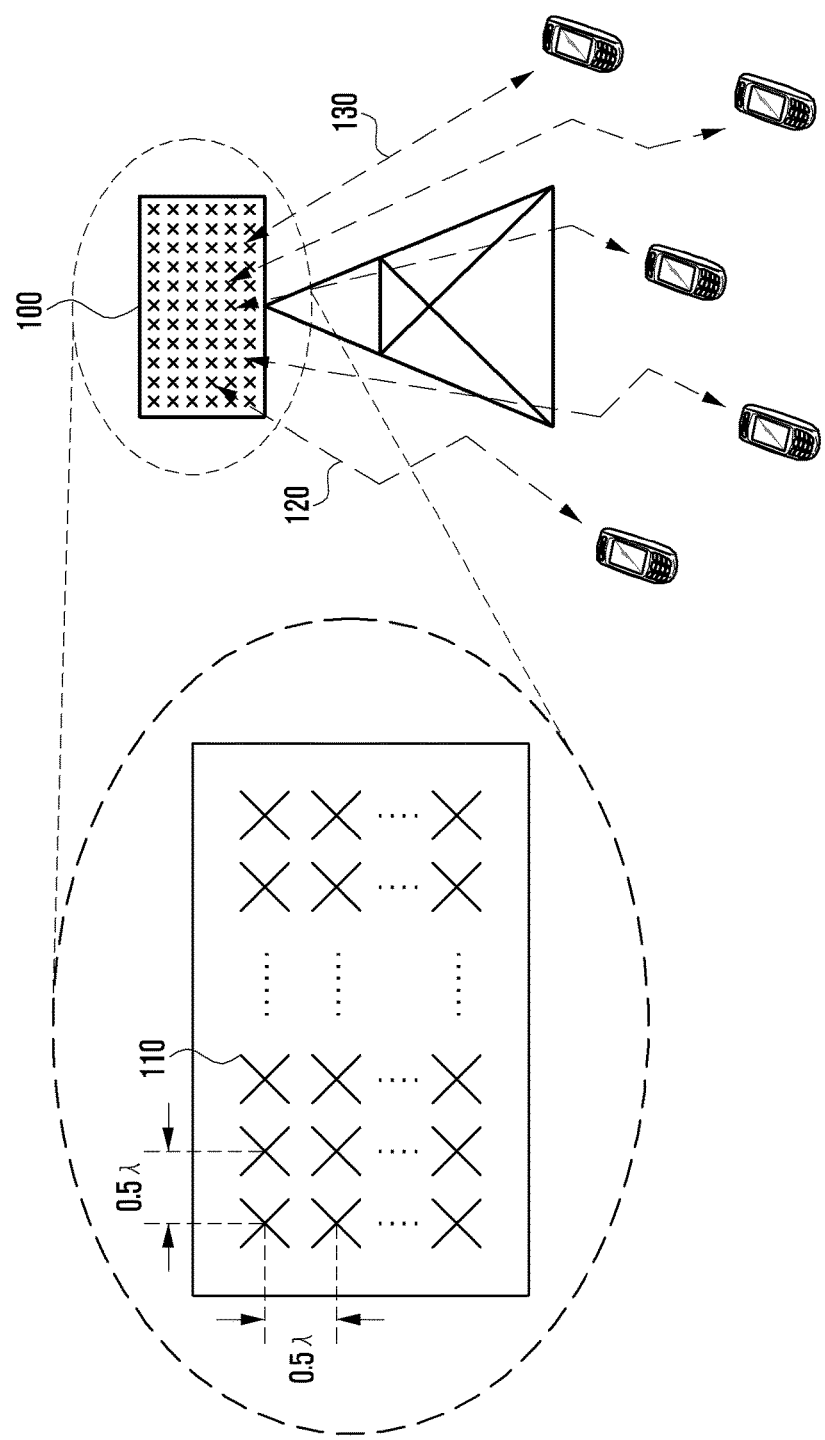
FIG. 1 illustrates an FD-MIMO system.

FIG. 1 illustrates the FD-MIMO system.

In FIG. 1, an eNB transmission device 100 transmits wireless signals to scores of transmission antennas. The plurality of transmission antennas are located a minimum distance from each other as indicated by reference numeral 110. An example of the minimum distance includes a half of a wavelength of the wireless signal. In general, when a distance corresponding to the half of the wavelength of the wireless signal is maintained between the transmission antennas, a signal transmitted from each transmission antenna is influenced by a wireless channel having low correlation. When a band of the transmitted wireless signal is 2 GHz, the distance is 7.5 cm. In general, as the band becomes higher, the distance becomes shorter.

In FIG. 1, the scores of transmission antennas located in the eNB 100 are used when one or more UEs transmit signals as indicated by reference numerals 120 and 130. Proper precodings are applied to a plurality of transmission antennas, and thus the plurality of transmission antennas simultaneously transmit signals to a plurality of UEs. At this time, one UE can receive one or more information streams. In general, a number of information streams which one UE can receive is determined by a number of reception antennas belonging to the UE and channel statuses.

In order to effectively implement the FD-MIMO system, the UE is required to accurately measure a channel status and an interference size and transmit effective channel status information to the eNB. The eNB having received the channel status information determines which UEs receive signals, which data transmission rate is used, and which precoding is applied with regard to downlink transmission through the use of the received channel status information. In the FD-MIMO system, when a conventional channel status information transmitting/receiving method of the LTE/LTE-A system is applied, since a number of transmission antennas is large, an uplink overhead problem in which a large amount of control information should be transmitted to the uplink is created.

The mobile communication system has limited time, frequency, and power resources. Accordingly, when many more resources are allocated to the RSs, resources which can be allocated to traffic channels (data traffic channels) are reduced, thereby reducing an absolute amount of transmitted data. In this event, channel measurement and estimation capabilities are improved, but an absolute amount of transmitted data is reduced, and thus overall system capacity performance may be rather reduced.

Accordingly, a proper distribution is required between resources for the RS and resources for the signal of traffic channel transmission to acquire optimal performance in terms of the overall system capacity.

Figure 2:
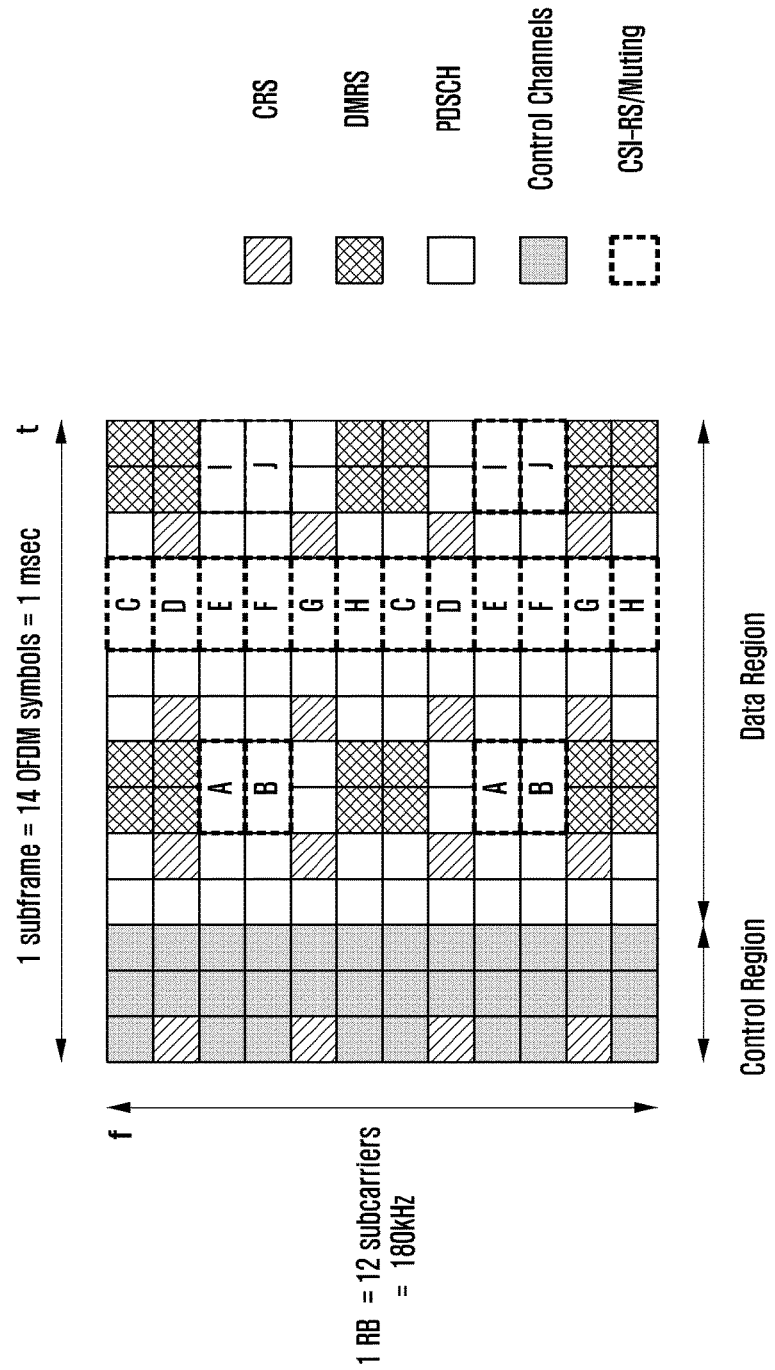
FIG. 2 illustrates radio resources of one subframe and one Resource Block (RB) corresponding to a minimum unit which can be scheduled to the downlink in an LTE/LTE-A system.

FIG. 2 illustrates a radio resource of one subframe and one Resource Block (RB) corresponding to a minimum unit which can be scheduled to the downlink in the LTE/LTE-A system.

The radio resource illustrated in FIG. 2 consists of one subframe on a time axis and one RB on a frequency axis. The radio resource consists of 12 subcarriers in a frequency domain and 14 OFDM symbols in a time domain, and thus has a total of 168 inherent frequency and time locations. In LTE/LTE-A, each of the inherent frequency and time locations in FIG. 2 is referred to as a Resource Element (RE).

In the radio resource illustrated in FIG. 2, a plurality of different types of signals below may be transmitted.

1. Cell Specific RS (CRS): CRS refers to an RS periodically transmitted to all UEs included in one cell and may be used by a plurality of UEs in common.

2. DeModulation RS (DMRS): DMRS refers to an RS transmitted to a specific UE and is transmitted only when data is transmitted to the corresponding UE. The DMRS may include a total of 8 DMRS ports. In LTE/LTE-A, port 7 to port 14 correspond to DMRS ports and the ports keep orthogonality by using CDM or DMF not to generate interference.

3. Physical Downlink Shared CHannel (PDSCH): PDSCH is used when the BS transmits traffic to the UE through a data channel transmitted to the downlink and is transmitted using an RE where the RS is not transmitted in a data region of FIG. 2.

4. Channel Status Information RS (CSI-RS): CSI-RS refers to an RS transmitted to UEs included in one cell and is used for measuring channel statuses. A plurality of CSI-RSs may be transmitted in one cell.

5. Other control channels (PHICH, PCFICH, and PDCCH): these channels provide control information required when the UE receives the PDSCH or transmits ACK/NACK for operating HARQ with respect to uplink data transmission.

In addition to the above signals, the LTE-A system may set muting in order to allow UEs in the corresponding cell to receive the CSI-RSs which another eNB transmits without any interference. The muting may be applied to a location where the CSI-RS can be transmitted and the UE generally hops the corresponding radio resource and receives a traffic signal. In the LTE-A system, the muting may also be referred to as a zero-power CSI-RS. The muting is applied to a location of the CSI-RS due to the nature of the muting since transmission power is not transmitted.

In FIG. 2, the CSI-RSs may be transmitted using some of locations indicated by A, B, C, D, E, F, G, H, I, and J based on a number of antennas transmitting the CSI-RSs. Further, the muting may be applied to some of the locations indicated by A, B, C, D, E, F, G, H, I, and J. Particularly, the CSI-RSs may be transmitted to 2, 4, or 8 REs according to a number of antenna ports transmitting the CSI-RSs. In FIG. 2, the CSI-RSs are transmitted to a half of a specific pattern when the number of antenna ports is 2, the CSI-RSs are transmitted to the entirety of the specific pattern when the number of antenna ports is 4, and the CSI-RSs are transmitted using two patterns when the number of antenna ports is 8. In the case of muting, always one pattern unit is made. That is, the muting may be applied to a plurality of patterns, but cannot be applied to only a part of one pattern when the muting does not overlap the CSI-RS. However, only when the location of the CSI-RS and the location of the muting overlap each other, the muting may be applied to a part of one pattern.

When CSI-RSs for two antenna ports are transmitted, the CSI-RSs transmit signals of the respective antenna ports in two REs connected to each other and the signals of the respective antenna ports are distinguished by an orthogonal code. Further, when CSI-RSs for four antenna ports are transmitted, in addition to the CSI-RSs for the two antenna ports, signals for additional two antenna ports are transmitted in the same way as the above by using additional two REs. A case where CSI-RSs for 8 antenna ports are transmitted is the same as the above description.

In a cellular system, an RS is transmitted to measure a downlink channel status. In an LTE-A system of 3GPP, the UE measures a channel status between the UE and the eNB by using a CRS or a Channel Status Information RS (CSI-RS) transmitted from the eNB. The channel status should basically consider several factors including an interference amount in the downlink. The interference amount in the downlink includes an interference signal and thermal noise generated by antennas included in adjacent eNBs, and they are important to determine a downlink channel status by the UE. For example, when an eNB having one transmission antenna transmits the RS to a UE having one reception antenna, the UE is required to decide Es/Io by determining energy per symbol which the eNB can receive in the downlink from the received RS and an interference amount simultaneously received in a section where the corresponding symbol is received. The determined Es/Io is converted to a data transmission rate or a value corresponding thereto and transmitted to the eNB in a form of a Channel Quality Indicator (CQI). Then, the eNB may determine a data transmission rate at which the eNB performs transmission to the UE in the downlink.

In the LTE-A system, the UE feeds back information on a downlink channel status to the eNB to allow the eNB to use the fed back information for scheduling. That is, the UE measures an RS which the eNB transmits in the downlink and feeds back information extracted from the measured RS to the eNB in a form defined by the LTE/LTE-A standard. Information fed back by the UE in LTE/LTE-A may be largely divided into the following three pieces of information.

- Rank Indicator (RI): RI refers to a number of spatial layers which the UE can receive in a current channel status
- Precoder Matrix Indicator (PMI): PMI refers to an indicator of a precoding matrix which the UE prefers in a current channel status.
- Channel Quality Indicator (CQI): CQI refers to a maximum data rate at which the UE can perform reception in a current channel status. The CQI may be replaced with a Signal to Interference and Noise Ratio (SINR), a maximum error correction coding rate and modulation scheme, and a data efficiency per frequency which can be used similarly to a maximum data transmission rate.

The RI, PMI, and CQI have meanings associated with each other. For example, the precoding matrix supported by LTE/LTE-A is differently defined according to each rank. Accordingly, X corresponding to a value of the PMI when the RI has a value of 1 and X corresponding to a value of the PMI when the RI has a value of 2 are differently interpreted. Further, it is assumed that the PMI and the X reported to the eNB by the UE are applied in the eNB when the UE determines the CQI. That is, reporting RI_X, PMI_Y, and CQI_Z to the eNB by the UE corresponds to reporting that the corresponding UE can perform reception at a data transmission rate corresponding to CQI_Z when the rank is RI_X and the precoding is PMI_Y. As described above, in calculating the CQI, the UE considers which transmission scheme is used for the eNB, and optimal performance can be acquired when actual transmission is performed using the corresponding transmission scheme.

In LTE/LTE-A, periodic feedback of the UE may be set as one feedback mode of the following four modes according to which feedback information is included.

1. Reporting mode 1-0: RI, wideband CQI (wCQI)
2. Reporting mode 1-1: RI, wCQI, PMI
3. Reporting mode 2-0: RI, wCQI, subband CQI (sCQI)
4. Reporting mode 2-1: RI, wCQI, sCQI, PMI A feedback timing of each of information on the four feedback modes is determined by values of $N_{pd}$, $N_{OFFSET,CQI}$, $M_{RI}$, and $N_{OFFSET,RI}$. In feedback mode 1-0, a transmission period of the wCQI is $N_{pd}$ and a feedback timing is determined with a subframe offset value of $N_{OFFSET,CQI}$. Further, a transmission period of the RI is $N_{pd}*M_{RI}$ and an offset is $N_{OFFSET,CQI}+N_{OFFSET,RI}$.

Figure 3:
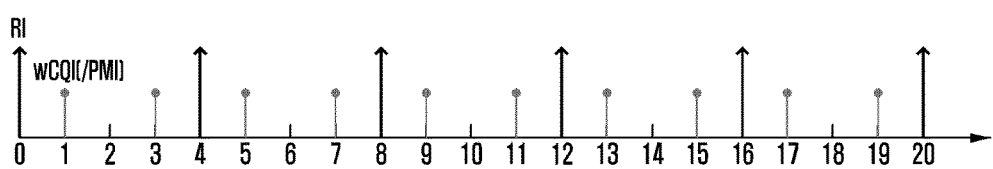
FIGS. 3 to 6 illustrate feedback timings according to an embodiment of the present invention.

FIG. 3 illustrates feedback timings of the RI and the wCQI when $N_{pd}=2$, $M_{RI}=2$, $N_{OFFSET,CQI}=1$, and $N_{OFFSET,RI}=-1$. In FIG. 3, each timing has a subframe index.

Feedback mode 1-1 has the same feedback timing as that of feedback mode 1-0, but has a difference in that the wCQI and the PMI are transmitted together at a transmission timing of the wCQI.

In feedback mode 2-0, a feedback period of the sCQI is $N_{pd}$ and an offset value is $N_{OFFSET,CQI}$. Further, a feedback period of the wCQI is $H*N_{pd}$ and an offset value is $N_{OFFSET,CQI}$ which is the same as the offset value of the sCQI. Here, H is defined as $H=J*K+1$. K is transmitted to a higher layer signal and J denotes a value determined according to a system bandwidth.

For example, J with respect to a 10 MHz system is defined as 3. As a result, the wCQI is transmitted once every H sCQI transmissions. Further, a period of the RI is $M_{RI}*H*N_{pd}$ and an offset is $N_{OFFSET,CQI}+N_{OFFSET,RI}$.

Figure 4:
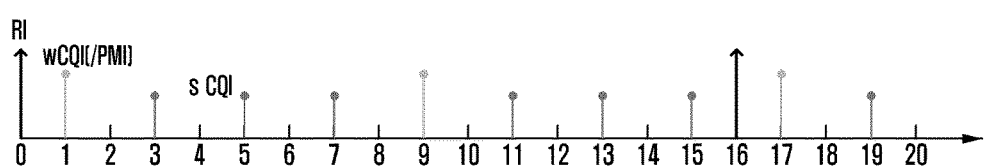

FIG. 4 illustrates feedback timings of the RI, sCQI, and wCQI when $N_{pd}=2$, $M_{RI}=2$, J=3 (10 MHz), K=1, $N_{OFFSET,CQI}=1$, and $N_{OFFSET,RI}=-1$.

Feedback mode 2-1 has the same feedback timing as that of feedback mode 2-0, but has a difference in that the wCQI and the PMI are transmitted together at a transmission timing of the wCQI.

The above described feedback timing corresponds to a case where a number of CSI-RS antenna ports is less than or equal to 4. In a case of the UE receiving the CSI-RSs for 8 antenna ports, two PMI information should be fed back unlike the feedback timing. With respect to 8 CSI-RS antenna ports, feedback mode 1-1 is divided into two submodes. In a first submode, the RI is transmitted together with first PMI information and second PMI information is transmitted together with the wCQI. A feedback period and an offset of the wCQI and the second PMI are defined as $N_{pd}$ and $N_{OFFSET,CQI}$, and a feedback period and an offset of the RI and the first PMI are defined as $M_{RI}*N_{PD}$ and $N_{OFFSET,CQI}+N_{OFFSET,RI}$. Here, when a precoding matrix corresponding to the first PMI is W1 and a precoding matrix corresponding to the second PMI is W2, the UE and the eNB share information indicating that precoding matrixes which the UE prefers are determined as W1 and W2.

In feedback mode 2-1 for 8 CSI-SI antenna ports, feedback of Precoding Type Indicator (PTI) information is added. The PTI is fed back together with the RI, and a period and an offset thereof are defined as $M_{RI}*H*N_{pd}$ and $N_{OFFSET,CQI}+N_{OFFSET,RI}$ respectively. When the PTI is 0, all of the first PMI, the second PMI, and the wCQI are fed back, and the wCQI and the second PMI are transmitted together at the same timing, and a period and an offset thereof are $N_{pd}$ and $N_{OFFSET,CQI}$, respectively. Further, a period of the first PMI is $H'*N_{pd}$ and an offset is $N_{OFFSET,CQI}$. H' is transmitted to a higher layer signal. In contrast, when the PTI is 1, the PTI is transmitted together with the RI, the wCQI and the second PMI are transmitted together, and the sCQI is additionally fed back at a separate timing. In this event, the first PMI is not transmitted. A period and an offset of the PTI and the RI are the same as those when the PTI is 0, and the sCQI has a period of $N_{pd}$ and an offset of $N_{OFFSET,CQI}$. Further, the wCQI and the second PMI are fed back with a period of $H*N_{pd}$ and an offset of $N_{OFFSET,CQI}$, and H is defined equally to a case where a number of CSI-RS antenna ports is 4.

Figure 5:
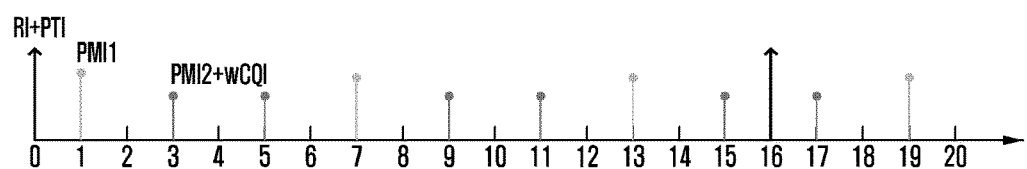
Figure 6:
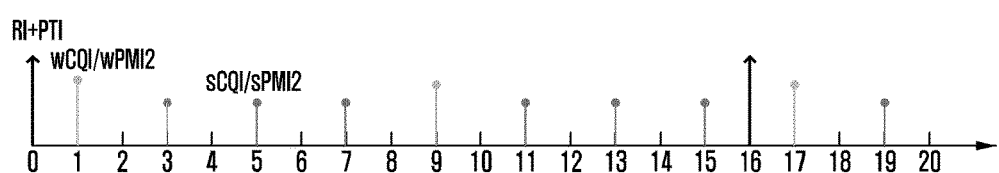

FIGS. 5 and 6 illustrate feedback timings when PTI=0 and PTI=1 in a case where $N_{pd}$=2, $M_{RI}$=2, J=3 (10 MHz), K=, H'=3, $N_{OFFSET,CQI}$=1, and $N_{OFFSET,RI}$=−1.

In general, when a number of transmission antennas is large like in FD-MIMO, CSI-RSs in proportion to the number f transmission antennas should be transmitted. For example, when 8 transmission antennas are used in LTE/LTE-A, the eNB transmits CSI-RSs corresponding to 8-ports to the UE to allow the UE to measure downlink channel statuses. At this time, in transmitting the CSI-RSs corresponding to the 8-ports, the eNB uses radio resources consisting of 8 REs within one RB, such as A and B of FIG. 2. When CSI-RS transmission of the LTE/LTE-A scheme is applied to FD-MIMO, radio resources proportional to a number of transmission antennas should be allocated to the CSI-RS. That is, when the number of transmission antennas of the eNB is 128, the CSI-RSs should be transmitted using a total of 128 REs within one RB. Such a CSI-RS transmission scheme requires excessive radio resources, so that an opposite effect of reducing radio resources necessary for wireless data transmission/reception occurs.

A method of preventing allocation of excessive radio resources when the eNB having a large number of transmission antennas transmits CSI-RSs like in FD-MIMO and allowing the UE to perform channel measurement for a large number of transmission antennas includes a method of N-dimensionally transmitting CSI-RSs. For example, when transmission antennas of the eNB are arranged on a two-dimensional plane as illustrated in FIG. 1, the CSI-RSs may be two-dimensionally transmitted.

Based on such a principle, RSs which the eNB transmits to the UE may be referred to as a first CSI-RS and a second CSI-RS. According to an embodiment of the present invention, the two types of RSs are distinguished in a horizontal direction and a vertical direction. One CSI-RS may be used as a horizontal CSI-RS for measuring horizontal channel information and the other CSI-RS may be used as a vertical CSI-RS for measuring vertical channel information. Although the RSs do not have to be necessarily distinguished into a horizontal component and a vertical component to apply a principle of the present invention described below, the following description will be made based on an assumption that the RSs which the eNB transmits to the UE are the horizontal CSI-RS and the vertical CSI-RS.

Figure 7:
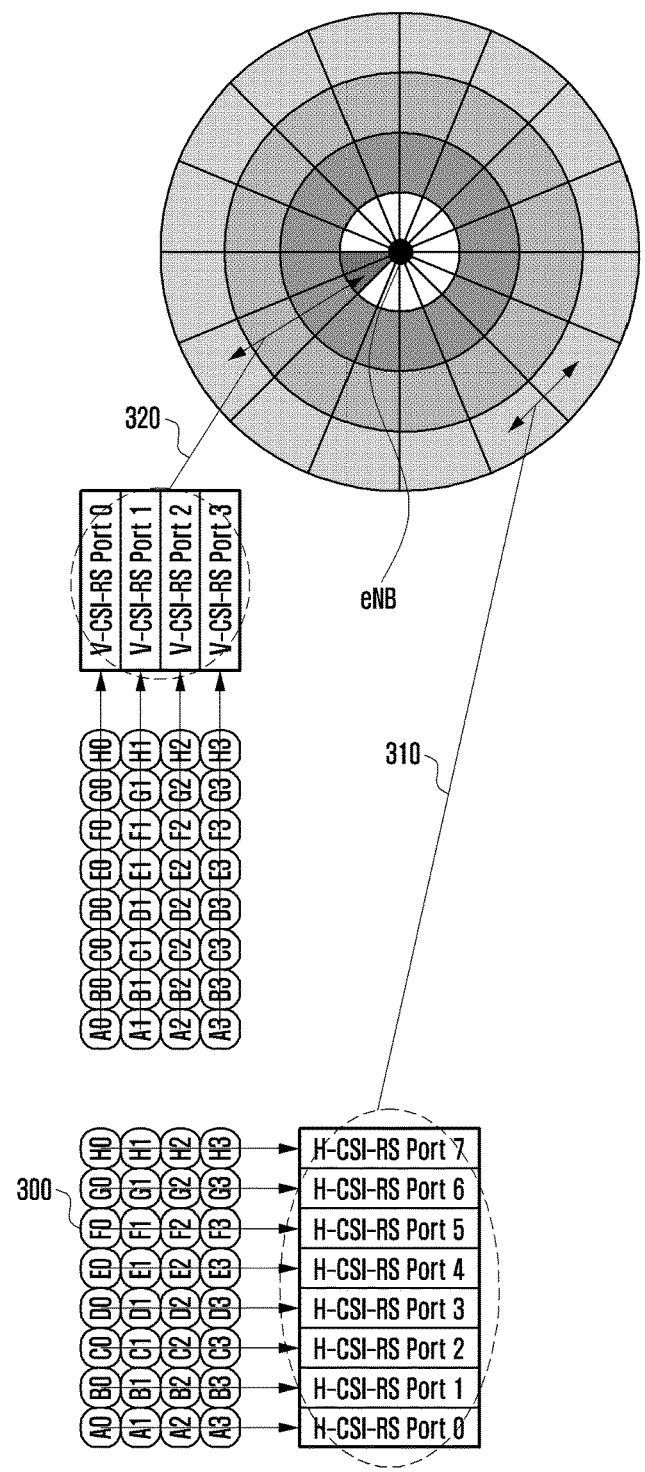
FIG. 7 illustrates CSI-RS transmission for FD-MIMO.

FIG. 7 illustrates CSI-RS transmission for FD-MIMO.

In FIG. 7, the eNB operating in a FD-MIMO system includes a total of 32 antennas. In FIG. 7, 32 antennas 300 are indicated by A0, . . . , A3, B0, . . . , B3, C0, . . . , C3, D0, . . . , D3, E0, . . . , E3, F0, . . . , F3, G0, . . . , G3, H0, . . . , H3. The 32 antennas of FIG. 7 perform transmission by two CSI-RSs. An H-CSI-RS for measuring a horizontal channel status includes the following 8 antenna ports.

H-CSI-RS port 0: configured by a combination of antennas A0, A1, A2, and A3
  H-CSI-RS port 1: configured by a combination of antennas B0, B1, B2, and B3
  H-CSI-RS port 2: configured by a combination of antennas C0, C1, C2, and C3
  CSI-RS port 3: configured by a combination of antennas D0, D1, D2, and D3
  H-CSI-RS port 4: configured by a combination of antennas E0, E1, E2, and E3
  H-CSI-RS port 5: configured by a combination of antennas F0, F1, F2, and F3
  H-CSI-RS port 6: configured by a combination of antennas G0, G1, G2, and G3
  H-CSI-RS port 7: configured by a combination of antennas H0, H1, H2, and H3

Generating one CSI-RS port by combining a plurality of antennas means antenna virtualization and is generally made through a linear combination of a plurality of antennas. Further, a V-CSI-RS for measuring a vertical channel status includes the following 4 antenna ports.

V-CSI-RS port 0: configured by a combination of antennas A0, B0, C0, E0, F0, G0, and H0
  V-CSI-RS port 1: configured by a combination of antennas A1, B1, C1, D1, E1, F1, G1, and H1
  V-CSI-RS port 2: configured by a combination of antennas A2, B2, C2, D2, E2, F2, G2, and H2
  V-CSI-RS port 3: configured by a combination of antennas A3, B3, C3, D3, E3, F3, G3, and H3

As described above, a plurality of antennas are two-dimensionally arranged at an M*N (vertical direction*horizontal direction) plane, FD-MIMO channels may be measured using N horizontal CSI-RS ports and M vertical CSI-RS ports. That is, when two CSI-RSs are used, channel status information may be grasped using M+N CSI-RS ports for M*N transmission antennas. As described above, grasping information on a larger number of transmission antennas by using a smaller number of CSI-RS ports acts as an important advantage in reducing CSI-RS overhead. In the above description, the channel information on the FD-MIMO transmission antennas is grasped using the two CSI-RSs, and such an approach may be equally applied to a case where K CSI-RSs are used.

In FIG. 7, 32 transmission antennas are allocated to 8 H-CSI-RS ports and 4 V-CSI-RS ports to allow the UE to measure wireless channels of the FD-MIMO system. In the above description, while the H-CSI-RS is used when the UE measures information on a horizontal angle between the UE and transmission antennas of the eNB as indicated by a reference numeral 310, the V-CSI-RS is used when the UE measures information on a vertical angle between the UE and transmission antennas of the eNB as indicated by a reference numeral 320.

Meanwhile, the UE measures channel information for a plurality of CSI-RSs transmitted as illustrated in FIG. 7, and transmits an RI, a PMI, and a CQI generated based on the CSI-RSs to the eNB, so as to inform the eNB of wireless channels of the FD-MIMO system.

Figure 8:
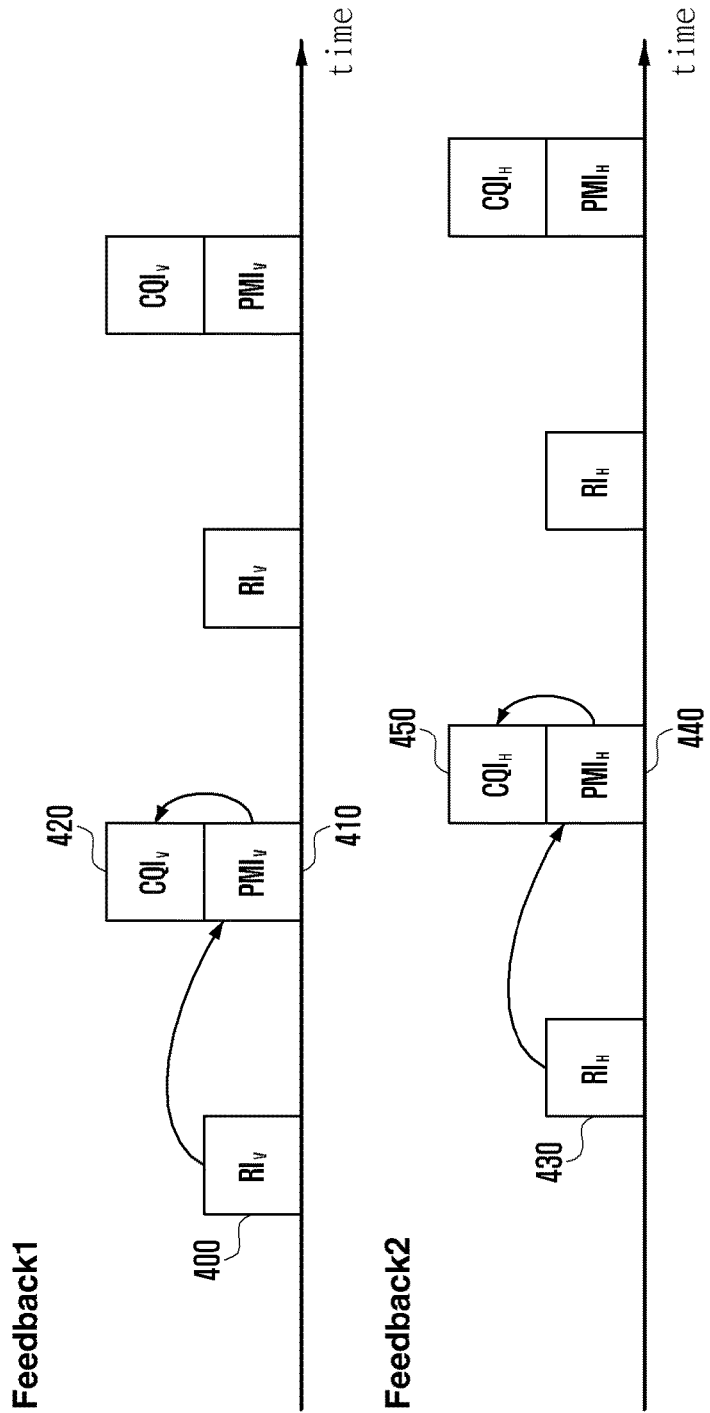
FIG. 8 illustrates a feedback method in which a UE transmits each of an RI, PMI, and CQI for two CSI-RSs.

FIG. 8 illustrates a feedback method in which the UE transmits each of the RI, the PMI, and the CQI for two CSI-RSs.

In FIG. 8, the UE receives first feedback (configuration) information (feedback 1) and second feedback (configuration) information (feedback 2) corresponding to independent feedback (configuration) information on the V-CSI-RS and the H-CSI-RS. That is, the UE measures the V-CSI-RS to transmit channel status information such as feedback 1 and measures the H-CSI-RS to transmit channel status information such as feedback 2.

The RI, the PMI, and the CQI are transmitted with correlation therebetween. That is, in feedback 1, RI informs of which rank includes a precoding matrix designated by the $PMI_v$ transmitted later. Further, when the eNB performs transmission with the rank designated by the $RI_v$ and a precoding matrix of the corresponding rank designated by the $PMI_v$ is applied, the $CQI_v$ corresponds to a data transmission rate at which the UE can perform reception or a value corresponding to the data transmission rate. In feedback 2, the RI, the PMI, and the CQI are also transmitted with correlation therebetween like in feedback 1.

In a feedback method as illustrated in FIG. 8, during a process in which the UE receives feedback for FD-MIMO, the UE first receives two CSI-RS resources {CSI-RS-1, CSI-RS-2} from the eNB. That is, the UE receives the two CSI-RSs from the eNB to be allowed to measure channels. At this time, the UE may not identify whether each of the two CSI-RSs corresponds to the V-CSI-RS or the H-CSI-RS. Thereafter, the UE receives two feedback information through Radio Resource Control (RRC) information and the RRC information for feedback allocation may be formed as shown in Table 1 below.

TABLE 1

| First feedback configuration (Feedback 1) | Second feedback configuration (Feedback 2) |
|---|---|
| CSI-RS information: CSI-RS-1 Reporting mode PMI codebook information Etc | CSI-RS information: CSI-RS-2 Reporting mode PMI codebook information Etc |

In Table 1, RRC information on feedback 1 and RRC information on feedback 2 are independently allocated, and PMI codebook information refers to information on a set of precoding matrixes which can be used for the corresponding feedback. When the PMI codebook information is not included in the RRC information for the feedback, all precoding matrixes pre-defined by the standard may be recognized as being able to be used for the feedback. Further, other information (Etc) to be included in the feedback allocation information shown in Table 1 may include a feedback period and offset information for periodic feedback or interference measurement resource information (feedback information may be reported to the eNB periodically or aperiodically).

In one of the channel status reporting methods for FD-MIMO, a plurality of feedback information are configured for a plurality of transmission antennas of the FD-MIMO eNB and the UE reports channel status information to the eNB through the feedback information as illustrated in FIG. 8.

Such a method has an advantage in that the UE does not require an additional implementation in generating and reporting the channel status information for FD-MIMO. In contrast, when the channel status information reporting method as illustrated in FIG. 8 is used, the FD-MIMO system cannot acquire enough performance.

As described above, the reason why the FD-MIMO system cannot acquire enough performance is that the UE does not transmit a Channel Quality Indicator (CQI), which considers precoding when FD-MIMO is applied, to the eNB through setting a plurality feedback information for a plurality of CSI-RSs and allowing the UE to report channel status information to the eNB alone as illustrated in FIG. 8.

This will now be described below in more detail. When a plurality of transmission antennas are two-dimensionally arranged in the FD-MIMO system as illustrated in FIG. 7, vertical and horizontal precodings are all applied. That is, the UE receives a signal to which precodings corresponding to a $PMI_H$ and a $PMI_V$ of FIG. 8 are simultaneously applied without receiving a signal to which only one of the precodings corresponding to the $PMI_H$ and the $PMI_V$ is applied. However, as illustrated in FIG. 8, when the UE reports only a $CQI_H$ or a $CQI_V$, which corresponds to a case where the precodings corresponding to the $PMI_H$ and the $PMI_V$ are separately applied, to the eNB, the eNB cannot receive a CQI corresponding to a case where all the precodings are applied from the UE and is required to determine the CQI by itself. As described above, the eNB determines by itself the CQI corresponding to the case where all the vertical and horizontal precodings are applied based on the CQIs corresponding to the case where the vertical and horizontal precodings are separately applied, which is a factor which deteriorates the performance of the system.

Accordingly, an embodiment of the present invention considers a method in which the UE receives two CSI-RSs corresponding to the vertical and horizontal directions and transmits feedback information of the CQI corresponding to the case where all the vertical and horizontal precodings are applied to the eNB as well as the RI, the $PMI_H$, and the $PMI_V$ which are feedback information required for FD-MIMO. That is, the UE generates the CQI corresponding to the case where all the vertical and horizontal precodings are applied according to a method described below and feeds back the generated CQI to the eNB.

First Embodiment

Figure 9:
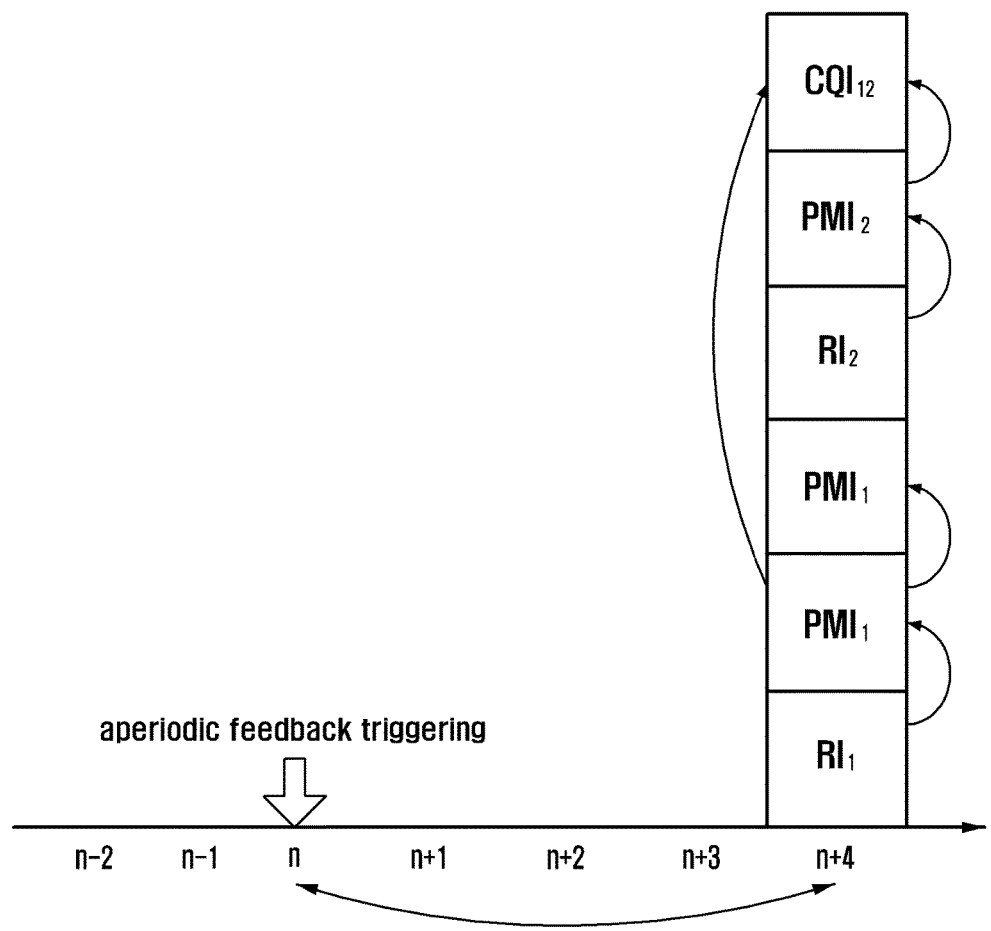
FIG. 9 illustrates a method in which a UE transmits an RI, PMI, and CQI for two CSI-RSs through aperiodic feedback according to a first embodiment of the present invention.

FIG. 9 illustrates a method in which the UE transmits the RI, the PMI, and the CQI for two CSI-RSs through aperiodic feedback according to a first embodiment of the present invention.

In FIG. 9, the feedback information of the UE is set by the eNB through two feedback configurations based on two CSI-RSs as shown in a method of Table 1, and the UE reports channel status information on the two CSI-RSs. One of the two feedback configurations includes configuration information for calculating the CQI corresponding to the case where all the vertical and horizontal precodings are applied, and thus the UE can perform feedback suitable for FD-MIMO. That is, the two feedback configurations for the two CSI-RSs of the eNB according to the first embodiment of the present invention may be configured by RRC information as shown in Table 2 below.

TABLE 2

| First feedback configuration (Feedback 1) | Second feedback configuration (Feedback 2) |
|---|---|
| CSI-RS information: CSI-RS-1 Reporting mode PMI codebook information Etc | CSI-RS information: CSI-RS-2 Reporting mode PMI codebook information FD-MIMO reference feedback: Feedback 1 Etc |

The two feedback configurations of Table 2 are the same as those of Table 1 in that the two feedback configurations are configured for CSI-RS-1 and CSI-RS-2, respectively. However, since feedback information corresponding to one (feedback 2) of the two feedback configurations includes a configuration (FD-MIMO reference feedback: Feedback 1) indicating that the feedback configuration (feedback 2) is calculated with reference to feedback information corresponding to the other feedback configuration (feedback 1), the eNB may make a setting such that the UE calculates and reports a part of the second feedback information with reference to a part of the first feedback information. Other feedback configuration information has the meanings shown in Table 1 above. That is, respective feedback information are configured for CSI-RS-1 and CSI-RS-2, and types of feedback information which the UE additionally generates and feeds back are included as reporting or feedback mode information. A configuration of the feedback mode may be defined like an aperiodic feedback mode defined in LTE/LTE-A. Further, information on a set of precoding matrixes which can be used for the feedback may be configured through PMI codebook information. As described in Table 1, when the PMI codebook information is not included in the RRC information for the feedback information, the UE recognizes that all defined available precoding matrixes can be used for the feedback information.

An aperiodic feedback reporting operation of the UE of which two feedback information are configured by the eNB through the RRC information as shown in Table 2 will be described with reference to FIG. 9. When the UE receives aperiodic feedback triggering scheduling for the first feedback and the second feedback from the eNB at an $n^{th}$ subframe, the UE reports feedback information according to the feedback configurations through the PDSCH at an n+4th subframe. At this time, the UE generates and reports an $RI_1$, a $PMI_1$, and a $CQI_1$ which are feedback information on the first feedback configuration. According to the configuration in Table 2, since separate feedback which the first feedback refers to is not configured, the $PMI_1$ is precoding information on the $RI_1$ which is rank information corresponding to the corresponding feedback configuration and the $CQI_1$ is generated and reported based on an assumption of precoding of the $PMI_1$ for the corresponding feedback configuration. An $RI_2$, a $PMI_2$, and a $CQI_{12}$ which are information on the second feedback configuration are reported together with the information on the first feedback configuration. According to the configuration of Table 2 above, since the second feedback is configured to generate the CQI with reference to the first feedback information (FD-MIMO reference feedback: Feedback 1), the $PMI_2$ is precoding information on the $RI_2$ which is rank information corresponding to the second feedback configuration, but $CQI_{12}$ is calculated and reported as the CQI (that is, $CQI_{12}$) corresponding to the case where all the precodings for the $PMI_1$ and the $PMI_2$ are applied with reference to the $PMI_1$ for the first feedback configuration configured for the reference as well as the $PMI_2$ for the second feedback configuration.

Here, a definition to determine the CQI corresponding to a case where a plurality of precodings are applied (that is, CQI corresponding to the case where all the precodings for the $PMI_1$ and the $PMI_2$ are applied) is required. When the CQI corresponding to the case where only one precoding is applied is calculated, the UE calculates the CQI based on an assumption that precoding designated by the RI and the PMI reported by the UE itself is applied to the downlink. However, in a case of the $CQI_{12}$ according to an embodiment of the present invention, the UE calculates the CQI ($CQI_{12}$) based on an assumption that two precodings, that is, precoding 1 generated by the $RI_1$ and the $PMI_1$ and precoding 2 generated by the $RI_2$ and the $PMI_2$ are simultaneously applied to the downlink. At this time, the UE may interpret the simultaneous application of the two precodings as a Kronecker product. The Kronecker product is defined for two matrixes below.

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad (1)$$

where, $A = \begin{bmatrix} a_{11} & \cdots & a_{1n} \\ \vdots & \ddots & \vdots \\ a_{m1} & \cdots & a_{mn} \end{bmatrix}$ In Equation (1), precoding corresponding to a case where two precodings are simultaneously applied can be acquired by replacing A and B with precoding matrixes designated by the $PMI_1$ and the $PMI_2$. In calculating the $CQI_{12}$, the UE calculates the CQI based on an assumption that the precoding acquired by applying the above equation to the precoding matrixes designated by the $PMI_1$ and the $PMI_2$ is applied to the downlink.

Meanwhile, in the second feedback configuration of Table 2 above, the part of the second feedback information is calculated and reported with reference to the part of the first feedback information, but the present invention is not limited thereto. That is, the FD-MIMO reference feedback field may be configured as "FD-MIMO reference feedback: Feedback 2" in the first feedback configuration. In this event, the part of the first feedback information is configured to be calculated and reported with reference to the part of the second feedback information. In the first embodiment of the present invention, the eNB allocates the respective feedback configurations for vertical and horizontal channels of FD-MIMO to the UE and inserts, into one of the two feedback configurations, configuration information for generating feedback information with reference to feedback information corresponding to the other feedback configuration, so as to allow the UE to generate the CQI ($CQI_{12}$) corresponding to the case where all the vertical and horizontal precodings are applied and report the generated CQI to the eNB. That is, when a particular feedback configuration (feedback 2) includes configuration information (FD-MIMO reference feedback: Feedback 1) for generating feedback information with reference to feedback information corresponding to the other feedback configuration (feedback 1), aperiodic feedback report information of the UE is as follows.

RI: RI refers to rank information which the UE prefers with respect to a channel measured by the CSI-RS for the corresponding feedback configuration (feedback 2).
  PMI: PMI refers to precoding matrix information which the UE prefers with respect to a channel measured by the CSI-RS for the corresponding feedback configuration (feedback 2).
  CQI: CQI refers to channel quality information corresponding to a case where all the precodings for the PMI reported on the feedback configuration (feedback 1) for the reference and the PMI reported on the corresponding feedback configuration (feedback 2) are applied. That is, the corresponding CQI is calculated based the following assumption:
    Assumption of number of antenna ports (CSI-RS ports): a product of a number of CSI-RS ports for the feedback configuration (feedback 1) configured for the reference and a number of CSI-RS ports for the corresponding feedback configuration (feedback 2).
    For reference, entire antenna ports (CSI-RS ports) correspond to multiple antenna channels formed by a Kronecker product of the CSI-RS ports for the feedback configuration (feedback 1) configured for the reference and the CSI-RS ports for the corresponding feedback configuration (feedback 2).
    Rank assumption: a product of a rank of an RI reported on the feedback configuration (feedback 1) configured for the reference and a rank of an RI reported on the corresponding feedback configuration (feedback 2) at the same subframe.

Precoding matrix assumption: a precoding matrix formed by a Kronecker product of precodings for a PMI reported on the feedback configuration (feedback 1) for the reference and a PMI reported on the corresponding feedback configuration (feedback 2) at the same subframe.

In the first embodiment, like the second configuration (feedback 2), when a particular feedback configuration includes the configuration information (FD-MIMO reference feedback: Feedback 1) for generating feedback information with reference to feedback information corresponding to the other feedback configuration (feedback 1), a restriction may be placed to configure the same reporting mode with respect to the feedback configuration (feedback 1) configured for the reference and the corresponding particular feedback (feedback 2) in order to remove complexity of the additional UE operation.

Second Embodiment

Figure 10:
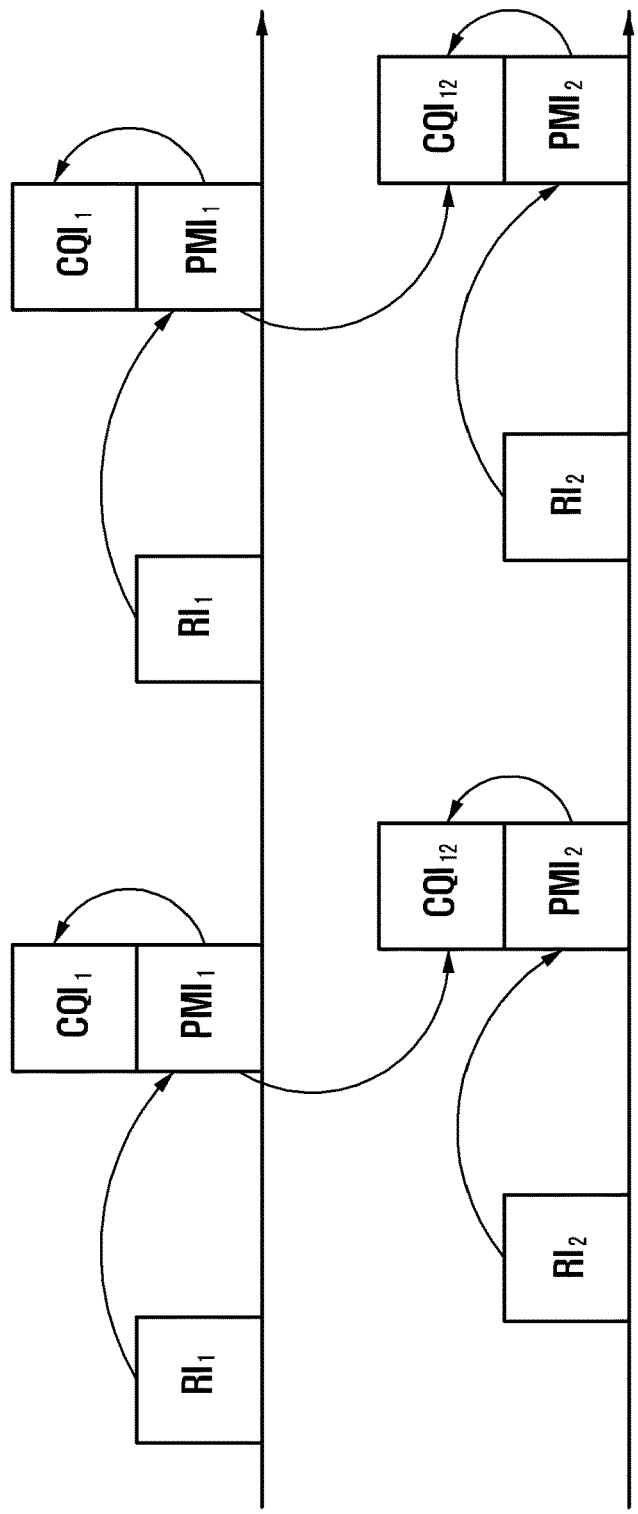
FIG. 10 illustrates a method in which a UE transmits an RI, PMI, and CQI for two CSI-RSs through periodic feedback according to a second embodiment of the present invention.

FIG. 10 illustrates a method in which the UE transmits the RI, the PMI, and the CQI for two CSI-RSs through periodic feedback according to a second embodiment of the present invention.

In FIG. 10, the feedback of the UE is set by the eNB through two feedback configurations based on two CSI-RSs as shown in a method of Table 2 and the UE reports channel status information on the two CSI-RSs. One of the two feedback configurations includes configuration information for allowing the UE to calculate the CQI corresponding to the case where all the vertical and horizontal precodings are applied, and thus the UE can perform feedback suitable for FD-MIMO. Since the second embodiment considers periodic feedback of the UE, feedback timing information for setting a report period and an offset for reporting the RI and PMI/CQI information is additionally included in Table 3. That is, the two feedback configurations for the two CSI-RSs of the eNB according to the second embodiment of the present invention may be configured by RRC information as shown in Table 3 below.

TABLE 3

| First feedback configuration (Feedback 1) | Second feedback configuration (Feedback 2) |
|---|---|
| CSI-RS information: CSI-RS-1 Reporting mode Feedback timing PMI codebook information Etc | CSI-RS information: CSI-RS-2 Reporting mode Feedback timing FD-MIMO reference feedback: Feedback 1 Etc |

The feedback configuration information of Table 3 is identical to and have the same meanings as the feedback configuration information of Table 2, other than the feedback timing information. That is, respective feedback information are set for two signals, such as CSI-RS-1 and CSI-RS-2, and the types of feedback information which the UE additionally generates and feeds back are included as reporting or feedback mode information. A configuration of the feedback mode may be defined like a periodic feedback mode defined in LTE/LTE-A. Further, information on a set of precoding matrixes which can be used for the feedback may be configured through PMI codebook information. As described in Table 1, when the PMI codebook information is not included in the RRC information for the feedback, the UE recognizes that all defined available precoding matrixes can be used for the feedback. Further, since one (feedback 2) of the two feedback configurations includes a configuration (FD-MIMO reference feedback: Feedback 1) indicating that the corresponding feedback information is calculated with reference to feedback information corresponding to the other feedback configuration (feedback 1), the eNB allows the UE to calculate and report a part of the second feedback information with reference to a part of the first feedback information.

A periodic feedback reporting operation of the UE of which two feedback information are set by the eNB through the RRC information as shown in Table 3 will be described with reference to FIG. 10.

The UE generates and reports corresponding feedback information according to corresponding periods and offsets with respect to two periodic feedback configurations allocated. At this time, since separate feedback for the reference is not configured for the first feedback information, the $PMI_1$ is precoding information on the most recently reported $RI_1$, which is the latest rank information corresponding to the corresponding feedback configuration, and the $CQI_1$ is also generated and reported based on an assumption of the precoding of the $PMI_1$ most recently reported on the corresponding feedback configuration. According to the configuration of Table 2, since the second feedback configuration is configured to generate the CQI with reference to the first feedback information (FD-MIMO reference feedback: Feedback 1), the $PMI_2$ is precoding information on the most recently reported $RI_2$, which is the latest rank information corresponding to the second feedback configuration, but the $CQI_{12}$ is calculated and reported as the CQI corresponding to the case where all the precodings for the most recently reported $PMI_1$ and the most recently reported $PMI_2$ are applied with reference to the $PMI_1$ most recently reported on the first feedback configuration for the reference as well as the $PMI_2$ most recently reported on the second feedback configuration. A definition of the CQI corresponding to the case where a plurality of precodings are applied is the same as that of the first embodiment.

RI: RI refers to rank information which the UE prefers with respect to a channel measured by the CSI-RS for the corresponding feedback configuration (feedback 2).

PMI: PMI refers to precoding matrix information which the UE prefers with respect to a channel measured by the CSI-RS for the corresponding feedback configuration (feedback 2).

CQI: CQI refers to channel quality information corresponding to a case where all precodings for the PMI most recently reported on the feedback configuration (feedback 1) for the reference and the PMI most recently reported on the corresponding feedback configuration (feedback 2) are applied. That is, the corresponding CQI is calculated based the following assumption:

Assumption of number of antenna ports (CSI-RS ports): a product of a number of CSI-RS ports for the feedback configuration (feedback 1) configured for the reference and a number of CSI-RS ports for the corresponding feedback configuration (feedback 2).

For reference, entire antenna ports (CSI-RS ports) correspond to multiple antenna channels formed by a Kronecker product of the CSI-RS ports for the feedback configuration (feedback 1) configured for the reference and the CSI-RS ports for the corresponding feedback configuration (feedback 2).

Precoding matrix assumption: a precoding matrix formed by a Kronecker product of precodings for the PMI most recently reported on the feedback configuration (feedback 1) configured for the reference and the PMI most recently reported on the corresponding feedback configuration (feedback 2).

In feedback of 8 CSI-RS ports in LTE-A, two PMIs determine one precoding matrix for one feedback configuration. At this time, a first PMI and a second PMI may be reported at different timings. Accordingly, when the feedback configuration for the reference corresponds to the case of 8 CSI-RS ports, the meaning of the recently reported PMI mentioned in the precoding matrix assumption corresponds to the precoding matrix generated by a sum of the first PMI for the feedback configuration for the reference and the second PMI.

Further, when particular PMI information is lost or the PMI for the reference does not exist since an initial report is not performed in a process of calculating the CQI corresponding to the case where all the precodings for the PMI1 most recently reported on the feedback configuration (feedback 1) for the reference and the PMI2 most recently reported on the corresponding feedback configuration (feedback 2) are applied, the CQI may be calculated based on an assumption that the PMI information which does not exist has a particular predetermined PMI value. For example, the particular predetermined PMI value may be a value corresponding to a precoding matrix having a smallest index among available precoding matrixes.

As described in the first embodiment, like the second feedback configuration (feedback 2), when a particular feedback configuration includes the configuration information (FD-MIMO reference feedback: Feedback 1) for generating feedback information with reference to feedback information corresponding to the other feedback configuration (feedback 1), a restriction may be placed to configure the same reporting mode with respect to the feedback configuration (feedback 1) for the reference and the corresponding particular feedback configuration (feedback 2) in order to remove complexity of the additional UE operation.

Figure 11:
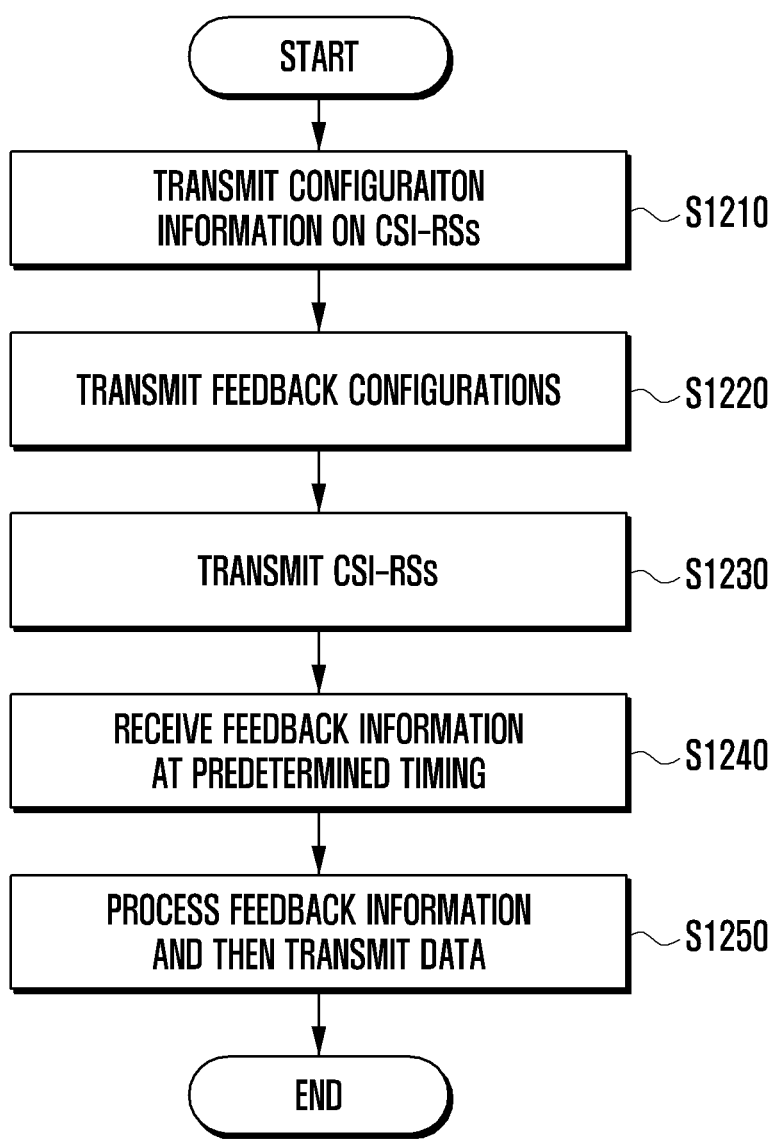
FIG. 11 is a flowchart illustrating an order of operations of an eNB according to an embodiment of the present invention.

FIG. 11 is a flowchart illustrating an order of operations of the eNB according to an embodiment of the present invention.

First, the eNB transmits a plurality of CSI-RS configurations (particularly, two CSI-RS configurations) to the UE in step S1210. The CSI-RS configuration includes a location of a subframe where the CSI-RS is transmitted and a location of a resource where the CSI-RS is disposed in the corresponding subframe.

Further, the eNB transmits feedback configurations to the UE in step S1220. The feedback configurations may include information shown in Table 2 and Table 3 according to each embodiment of the present invention. That is, the feedback configurations are reported on two respective CSI-RSs, but one of the two feedback configurations may be configured to refer to information on the other feedback configuration.

The eNB transmits each of the two CSI-RSs to the UE in step S1230.

Then, the eNB receives feedback information transmitted from the UE at a predetermined timing in step S1240. In this event, the eNB receives feedback information including first feedback information according to the first feedback configuration and second feedback information according to the second feedback configuration from the UE. The second feedback information includes feedback information generated for a second reference signal with reference to the first feedback configuration, and the feedback information may include a CQI.

Further, when the feedback information is aperiodically received, the CQI included in the second feedback information is calculated based on an assumption that a number of entire antenna ports corresponds to a product of a number of reference signal ports for the first feedback configuration information and a number of reference signal ports for the second feedback configuration information, a rank corresponds to a product of a rank indicator reported on the first feedback configuration information and a rank indicator reported on the second feedback configuration information at the same feedback information reception timing, and a precoding matrix is formed by a Kronecker product of precoding for a precoding matrix index reported on the first feedback configuration information and precoding of a precoding matrix index reported on the second feedback configuration information at the same feedback information reception timing.

In addition, when the feedback information is periodically received, the CQI is calculated based on an assumption that a number of entire antenna ports corresponds to a product of a number of reference signal ports for the first feedback configuration information and a number of reference signal ports for the second feedback configuration information, and a precoding matrix is formed by a Kronecker product of precoding for a precoding matrix index most recently reported on the first feedback configuration information and precoding for a precoding matrix index most recently reported on the second feedback configuration information.

The eNB processes the feedback information received from the UE and transmits data to the UE based on a processing result in step S1250.

Figure 12:
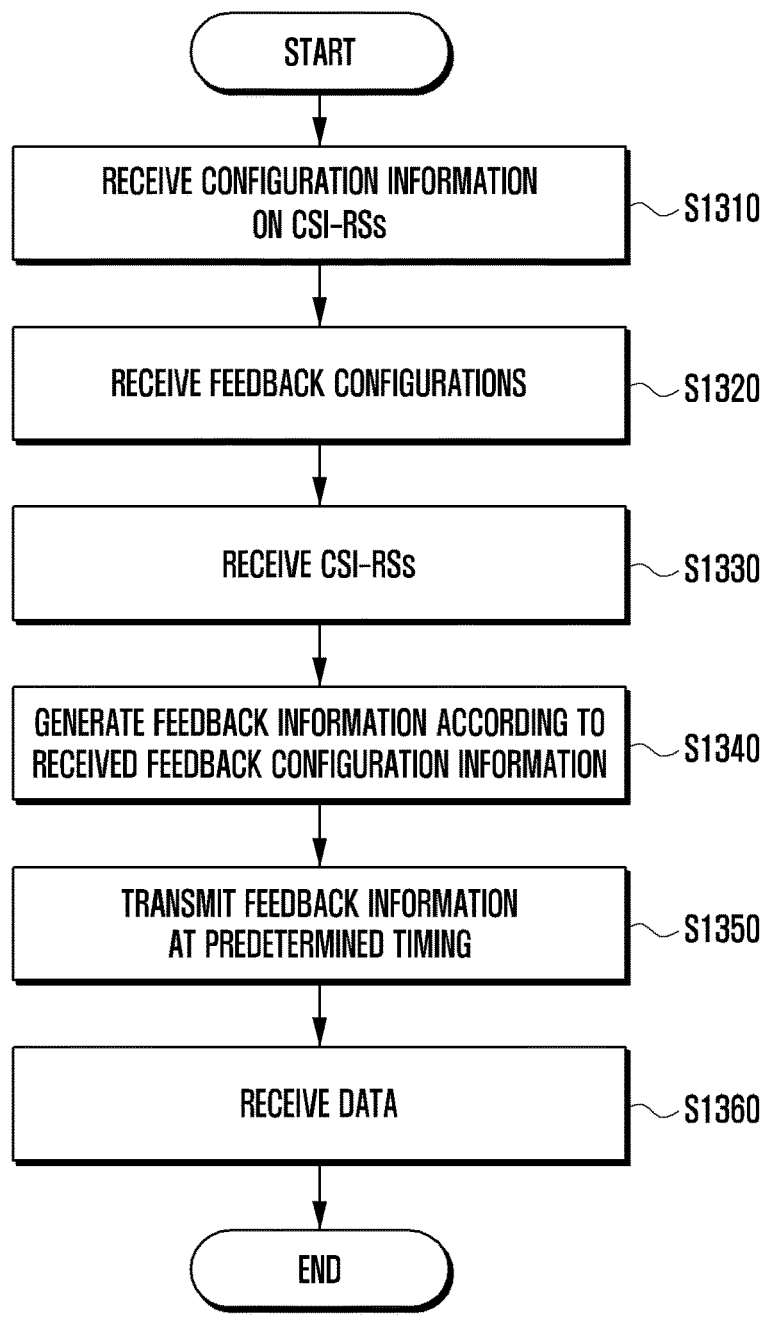
FIG. 12 is a flowchart illustrating an order of operations of a UE according to an embodiment of the present invention.

FIG. 12 is a flowchart illustrating an order of operations of the UE according to an embodiment of the present invention.

First, the UE receives a plurality of CSI-RS configurations from the eNB in step S1310. The CSI-RS configuration includes a location of a subframe where the CSI-RS is transmitted and a location of a resource where the CSI-RS is disposed in the corresponding subframe.

Further, the UE receives feedback configurations from the eNB in step S1320. The feedback configurations may include information shown in Table 2 and Table 3 according to each embodiment of the present invention. According to an embodiment of the present invention, one of the two feedback configurations may be configured to refer to the other feedback configuration.

The UE receives each of the two CSI-RSs from the eNB in step S1330.

Then, the UE generates feedback information according to the received feedback configurations in step S1340. In this event, the UE generates feedback information including first feedback information according to the first feedback configuration and second feedback information according to the second feedback configuration. The second feedback information includes feedback information generated for a second reference signal with reference to the first feedback configuration and the feedback information may include a CQI.

When the feedback information is aperiodically transmitted, the CQI is calculated based on an assumption that a number of entire antenna ports corresponds to a product of a number of reference signal ports for the first feedback configuration information and a number of reference signal ports for the second feedback configuration information, a rank corresponds to a product of a rank indicator reported on the first feedback configuration information and a rank indicator reported on the second feedback configuration information at the same feedback information reception timing, and a precoding matrix is formed by a Kronecker product of precoding for a precoding matrix index reported on the first feedback configuration information and precoding of a precoding matrix index reported on the second feedback configuration information at the same feedback information reception timing.

Further, when the feedback information is periodically transmitted, the CQI is calculated based on an assumption that a number of entire antenna ports corresponds to a number of reference signal ports for the first feedback configuration information and a number of reference signal ports for the second feedback configuration information, and a precoding matrix is formed by a Kronecker product of precoding for a precoding matrix index most recently reported on the first feedback configuration information and precoding for a precoding matrix index most recently reported on the second feedback configuration information.

The UE transmits feedback information to the eNB at a timing set by the feedback configuration in step S1350. Further, the UE receives data transmitted from the eNB and processes the received data in step S1360.

Figure 13:
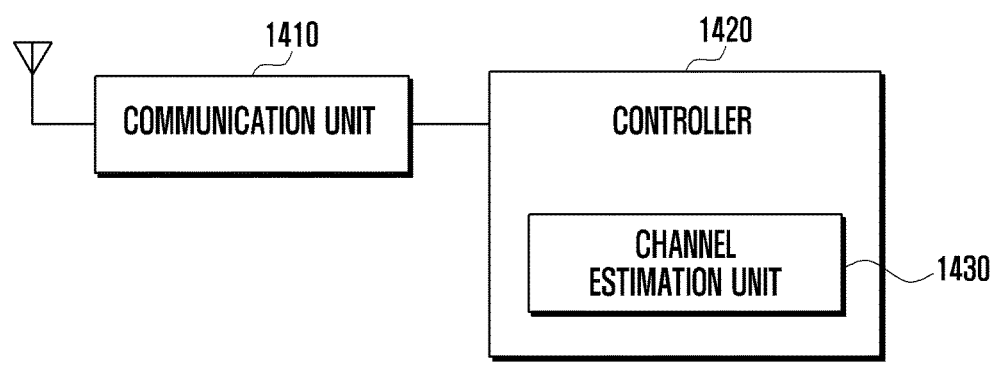
FIG. 13 is a block diagram illustrating an internal structure of a UE according to an embodiment of the present invention.

FIG. 13 is a block diagram illustrating an internal structure of the UE according to an embodiment of the present invention. Referring to FIG. 13, the UE includes a communication unit 1410 and a controller 1420.

The communication unit 1410 performs a function of transmitting or receiving data from the outside (for example, eNB). The communication unit 1410 transmits feedback information for an FD-MIMO technique to the eNB under a control of the controller 1420.

The controller 1420 controls states and operations of all components included in the UE. The controller 1420 generates feedback information for FD-MIMO according to information received from the current eNB and feeds back generated channel information to the eNB according to timing information received from the eNB. To this end, the controller 1420 includes a channel estimation unit 1430.

The channel estimation unit 1430 determines required feedback information through the CSI-RSs and feedback allocation information received from the eNB and estimates channels by using the received CSI-RSs.

Although it has been described herein that the UE includes only the communication unit 1410 and the controller 1420, the present invention is not limited thereto. That is, the UE may further include various components according to functions performed by the UE. For example, the UE may include a display unit for displaying a current state of the UE, an input unit for receiving a signal, such as function performance, from a user, and a storage unit for storing data generated in the UE.

Further, although it has been described that the controller 1420 and the channel estimation unit 1430 are configured as separated blocks, the present invention is not limited thereto. For example, the controller 1420 may perform a function of the channel estimation unit 1430.

The controller 1420 controls to receive configuration information for two or more reference signals from the eNB. Further, the controller 1420 controls to measure the two or more reference signals and receive feedback configurations for generating feedback information according to a result of the measurement from the eNB. Thereafter, the controller 1420 receives the two or more reference signals from the eNB, measures the received two or more reference signals, and generates feedback information according to the feedback configurations. Further, the controller 1420 controls to transmit the generated feedback information to the eNB at a feedback timing according to the feedback configuration.

In this event, the feedback configurations may include at least one of information indicating that the first reference signal corresponds to first channel information and the second reference signal corresponds to second channel information, configuration information indicating that second feedback information is calculated with reference to first feedback information, and a feedback timing related parameter as shown in Tables 2 and 3.

Further, feedback information may include at least one of a first rank indicator (RI1) generated in accordance with the first reference signal, a second rank indicator (RI2) generated in accordance with the second reference signal, a first precoding matrix indicator (PMI1) generated in accordance with the first reference signal, a second precoding matrix indicator (PMI2) generated in accordance with the second reference signal, and a channel quality indicator (CQI12) generated in consideration of first precoding generated by the first rank indicator and the first precoding matrix indicator and second precoding generated by the second rank indicator and the second precoding matrix indicator.

Meanwhile, in an embodiment of the present invention, the CQI generated by the UE corresponds to a Kronecker product of a first precoding matrix indicated by the first precoding matrix indicator and a second precoding matrix indicated by the second precoding matrix indicator.

Figure 14:
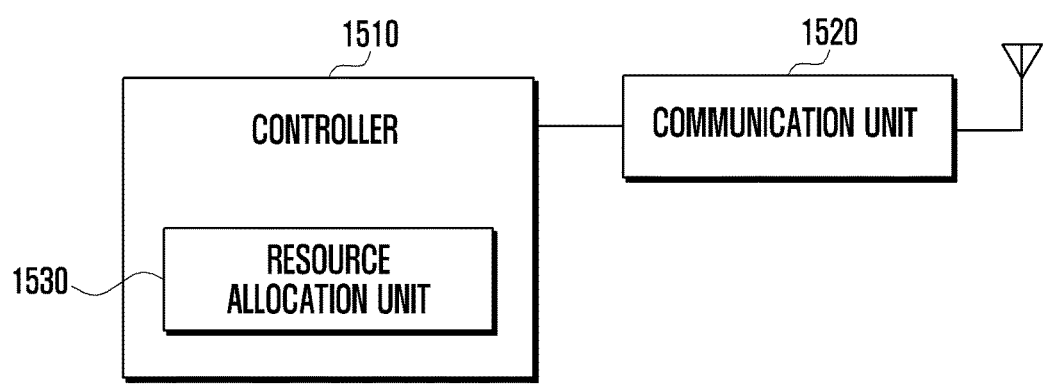
FIG. 14 is a block diagram illustrating an internal structure of an eNB according to an embodiment of the present invention.

FIG. 14 is a block diagram illustrating an internal structure of the eNB according to an embodiment of the present invention. Referring to FIG. 14, the eNB includes a controller 1510 and a communication unit 1520.

The controller 1510 controls states and operations of all components included in the eNB. The controller 1510 allocates CSI-RS resources for estimating horizontal and vertical component channels of the UE and allocates feedback resources and feedback timing. To this end, the controller 1510 further includes a resource allocation unit 1530.

The resource allocation unit 1530 allocates CSI-RS to respective resources to allow the UE to estimate each of the vertical and horizontal component channels and transmits the CSI-RSs by using the corresponding resources. Further, in order to avoid a conflict among feedbacks of several UEs, the eNB allocates feedback configurations and feedback timings, and receives and analyzes feedback information at the corresponding timing.

The communication unit 1520 performs a function of transmitting/receiving data, reference signals and feedback information to/from the UE. The communication unit 1520 transmits CSI-RSs through allocated resources and receives feedback of channel information from the UE under a control of the controller 1510.

Although it has been described that the controller 1510 and the resource allocation unit 1530 are configured as separated blocks, the present invention is not limited thereto. For example, the controller 1510 may perform a function of the resource allocation unit 1530. In this event, the controller 1510 controls to transmit configuration information on two or more reference signals to the UE, measures the two or more reference signals, and transmits feedback configurations for generating feedback information according to a result of the measurement to the UE.

Further, the controller 1510 controls to transmit the two or more reference signals to the UE and receives feedback information transmitted from the UE at a feedback timing according to the feedback configuration.

According to the embodiments of the present invention described above, it is possible to prevent the eNB having a large number of transmission antennas like in FD-MIMO from allocating excessive resources when CSI-RSs are transmitted, and the UE can effectively measure channels of the large number of transmission antennas, configure feedback information of the channels, and transmit the feedback information to the eNB.

While the invention has been shown and described with reference to certain embodiments thereof, it will be understood by those skilled in the art that various changes in form and detail may be made therein without departing form the spirit and scope of the invention as defined by the appended claims.

What is claimed is:

1. A method in a mobile communication system, the method comprising:
    transmitting a configuration message including report mode information, a first channel status indication reference signal (CSI-RS) resource configuration, and a second CSI-RS resource configuration; and
    receiving a feedback message including a channel quality indicator (CQI),
    wherein a rank indicator and a precoding matrix indicator are included in the feedback message based on the report mode information,
    wherein the CQI is generated using both of the first CSI-RS resource configuration and the second CSI-RS resource configuration in case that the configuration message includes a type of multiple input multiple output (MIMO), and
    wherein a number of antenna ports associated with the CQI is determined based on a number of antenna ports associated with the first CSI-RS resource configuration and a number of antenna ports associated with the second CSI-RS resource configuration.

2. The method of claim 1, wherein the precoding matrix indicator is determined based on codebook information associated with the type of MIMO included in the configuration message.

3. The method of claim 2, wherein the precoding matrix indicator is selected within precoding matrices defined by the codebook information.

4. A method in a mobile communication system, the method comprising:
    receiving a configuration message including report mode information, a first channel status indication reference signal (CSI-RS) resource configuration, and a second CSI-RS resource configuration; and
    transmitting a feedback message including a channel quality indicator (CQI),
    wherein a rank indicator and a precoding matrix indicator are included in the feedback message based on the report mode information,
    wherein the CQI is generated using both of the first CSI-RS resource configuration and the second CSI-RS resource configuration in case that the configuration message includes a type of multiple input multiple output (MIMO), and
    wherein a number of antenna ports associated with the CQI is determined based on a number of antenna ports associated with the first CSI-RS resource configuration and a number of antenna ports associated with the second CSI-RS resource configuration.

5. The method of claim 4, wherein the precoding matrix indicator is determined based on codebook information associated with the type of MIMO included in the configuration message.

6. The method of claim 5, wherein the precoding matrix indicator is selected within precoding matrices defined by the codebook information.

7. An evolved Node B (eNB) in a mobile communication system, the eNB comprising:
    a transceiver for transmitting and receiving signals; and
    a controller configured to:
        transmit a configuration message including report mode information, a first channel status indication reference signal (CSI-RS) resource configuration and a second CSI-RS resource configuration, and
        receive a feedback message including a channel quality indicator (CQI),
    wherein a rank indicator and a precoding matrix indicator are included in the feedback message based on the report mode information,
    wherein the CQI is generated using both of the first CSI-RS resource configuration and the second CSI-RS resource configuration in case that the configuration message includes a type of multiple input multiple output (MIMO), and
    wherein a number of antenna ports associated with the CQI is determined based on a number of antenna ports associated with the first CSI-RS resource configuration and a number of antenna ports associated with the second CSI-RS resource configuration.

8. The eNB of claim 7, wherein the precoding matrix indicator is determined based on codebook information associated with the type of MIMO included in the configuration message.

9. The eNB of claim 8, wherein the precoding matrix indicator is selected within precoding matrices defined by the codebook information.

10. A user equipment (UE) in a mobile communication system, the UE comprising:
    a transceiver for transmitting and receiving signals; and
    a controller configured:
        receive a configuration message including report mode information, a first channel status indication reference signal (CSI-RS) resource configuration and a second CSI-RS resource configuration, and
        transmit a feedback message including a channel quality indicator (CQI),
    wherein a rank indicator and a precoding matrix indicator are included in the feedback message based on the report mode information,
    wherein the CQI is generated using both of a first CSI-RS resource configuration and the second CSI-RS resource configuration in case that the configuration message includes a type of multiple input multiple output (MIMO), and
    wherein a number of antenna ports associated with the CQI is determined based on a number of antenna ports associated with the first CSI-RS resource configuration and a number of antenna ports associated with the second CSI-RS resource configuration.

11. The UE of claim 10, wherein the precoding matrix indicator is determined based on codebook information associated with the type of MIMO included in the configuration message.

12. The UE of claim 11, wherein the precoding matrix indicator is selected within precoding matrices defined by the codebook information.

* * * * *